United States Patent [19]

Speich

[11] Patent Number: 4,584,742
[45] Date of Patent: Apr. 29, 1986

[54] TENSIONING DEVICE FOR TENSIONING LINES, PARTICULARLY CHAINS OR BELTS

[75] Inventor: Herrn H. Speich, Hüttlingen, Fed. Rep. of Germany

[73] Assignee: RUD-Kettenfabrik Rieger & Dietz GmbH u. Co., Aalen, Fed. Rep. of Germany

[21] Appl. No.: 677,165

[22] Filed: Dec. 3, 1984

[30] Foreign Application Priority Data

Dec. 6, 1983 [DE] Fed. Rep. of Germany ....... 3344486

[51] Int. Cl.$^4$ ............................................ B25B 25/00
[52] U.S. Cl. ................. 24/68 CD; 24/68 R; 24/71.2
[58] Field of Search .............. 24/68 CD, 68 R, 19, 24/71.2; 294/74, 75; 254/218

[56] References Cited

U.S. PATENT DOCUMENTS

| | | | |
|---|---|---|---|
| 2,993,680 | 7/1961 | Davis | 24/68 CD |
| 3,175,806 | 3/1965 | Prete, Jr. | 24/68 CD |
| 3,749,366 | 7/1973 | Brucker | 24/68 CD |
| 3,804,368 | 4/1974 | Bailey | 24/68 CD |
| 3,826,473 | 7/1974 | Huber | 24/68 CD |
| 4,185,360 | 1/1980 | Prete, Jr. et al. | 24/68 CD |
| 4,199,182 | 4/1980 | Sunesson | 24/68 CD |
| 4,227,286 | 10/1980 | Holmberg | 24/68 CD |
| 4,324,022 | 4/1982 | Prete, Jr. | 24/68 CD |

FOREIGN PATENT DOCUMENTS 579154 12/1956 Italy ................................ 24/68 CD

*Primary Examiner*—Victor N. Sakran
*Attorney, Agent, or Firm*—F. Eugene Davis, IV; Mark P. Stone

[57] ABSTRACT

In a tensioning device for tensioning lines having a drive element for the tensioning line, the drive element is coupled to a ratchet wheel which can be set into rotary movement by a pivot lever with a drive pawl. The directionally oriented notches of the ratchet wheel are shaped so that the pivot lever can be operated in an ergonomically favorable direction during tensioning of the tensioning line. This is made possible in that the notch back of the notch of the ratchet wheel which cooperates with a blocking mechanism in its blocking or detent position is remote from the free end of the pivot lever.

7 Claims, 4 Drawing Figures

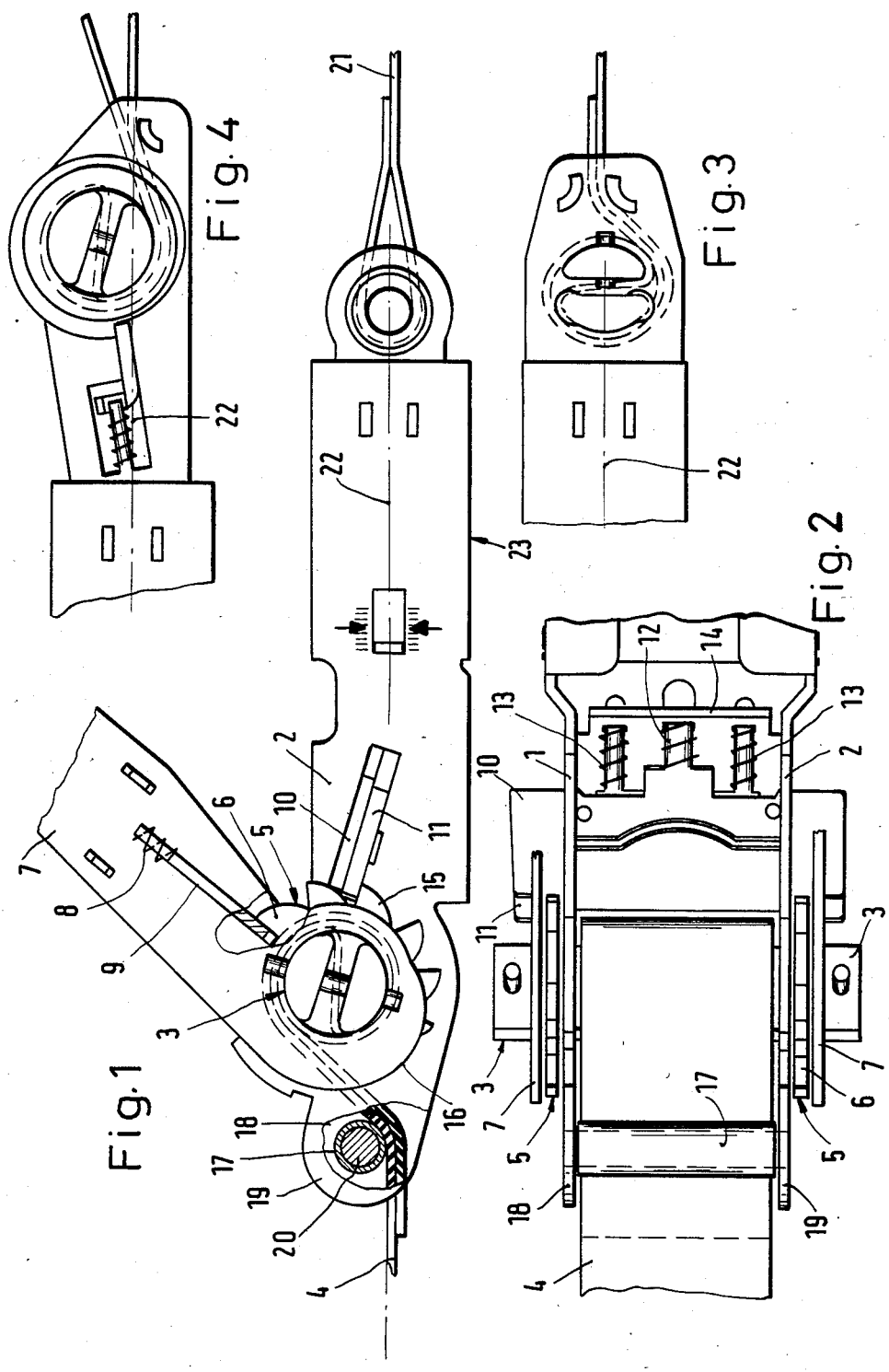

TENSIONING DEVICE FOR TENSIONING LINES, PARTICULARLY CHAINS OR BELTS

BACKGROUND OF THE INVENTION

The invention relates to a tensioning device for tensioning lines, particularly chains or belts, having a rotatable drive element serving to wind up the tensioning line, at least one ratchet wheel connected integrally in rotation to the latter, and exhibiting directionally oriented notches, and a pivot lever serving to introduce the rotary movement into the drive element, on which a drive pawl cooperating with the ratchet wheel is mounted slidably counter to the action of a spring and which is provided with at least one control cam to transfer a blocking mechanism associated with the ratchet wheel into an inoperative position, whilst the notches of the ratchet wheel are shaped so that they are retained firmly by the detent pawl during movement of the pivot lever in one direction, whereas during the movement of the pivot lever in the opposite direction they are entrained by the latter via the drive pawl.

A tensioning device of the type in question is known from U.S. Pat. No. 4,199,182, wherein the free end of the tensioning lever must be moved away from the tensioning device in order to tension the tensioning line. Such a construction of the tensioning device cannot be satisfactory from the ergonomic standpoint. This applied particularly in cases where the tensioning device is used to lash down loads on vehicle.

SUMMARY OF THE INVENTION

The underlying aim of the invention is to transform a tensioning device of the type in question so that it permits more convenient manipulation, in that it permits its user to utilize his body weight when operating the tensioning lever. In this manner it is possible to realize high short peaks of tensioning force, which permit high pretensioning forces to be introduced into the tensioning line.

The aim underlying the invention is achieved according to the invention in that the notches of the ratchet wheel are shaped so that the notch back of the respective notch in engagement with the detent mechanism in the blocked position of the ratchet wheel is remote from the free end of the pivot lever.

The tensioning device according to the invention presents the advantage that, in an unexpectedly simple manner, namely by the reversal of the direction of movement of the tensioning lever compared to conventional tensioning devices of the type in question, the exertion of high pretensioning forces desirable particularly when lashing down loads is substantially facilitated. In order to permit the high pretensioning forces achieved also to be maintained at as full a value as possible, it is recommended to construct the blocking mechanism of the tensioning device in the sense of patent claims 2 to 4.

In order to ensure that the goods to be lashed do not become damaged by the tensioning device during the tensioning of the tensioning line, a construction of the tensioning device according to claim 5 is found advantageous.

BRIEF DESCRIPTION OF THE DRAWINGS

Further particulars and features of the tensioning device according to the invention will emerge from the remaining subordinate claims and from the following description, also from the accompanying figures, wherein:

FIG. 1 shows a partial side elevation of a tensioning device for use in combination with belts;

FIG. 2 shows a partial plan of the tensioning device according to FIG. 1;

FIG. 3 shows a modified connection of the tensioning device according to FIG. 1 and FIG. 4 shows a further modified connection of the tensioning device according to FIG. 1.

DESCRIPTION OF THE PREFERRED EMBODIMENT

In the FIGS. 1 and 2 designate side walls of a tensioning device, between which a drive element 3 for a tensioning line 4 is mounted rotatably. The tensioning line 4 is formed by a belt in the case illustrated. Two ratchet wheels 5, which are provided with a plurality of load-oriented notches 6, are connected integrally in rotation to the drive element 3. A pivot lever 7 is mounted upon the axis of rotation of the drive element, rotatably upon the latter. A drive pawl 9, which is guided slidably counter to the action of a spring 8 in the pivot lever 7, entrains the ratchet wheel 5 clockwise during rotation of the pivot lever.

10 and 11 designate two blocking elements of slider-like construction forming a blocking mechanism. The blocking element 10 is braced via a spring 12, and the blocking element 11 via two springs, 13 against a yoke 14.

As is clearly visible from FIG. 1 the notches 6 of the two ratchet wheels 5 arranged on each side of the side walls 1 and 2 are shaped so that the notch backs 15 of the respective notch 6 in engagement with the blocking mechanism 10, 11 in the blocked position of the ratchet wheels 5 is remote from the free end, not shown, of the pivot lever 7. To express this in other words, it means that the blocking element 10 or 11 abutting the notch surface of a notch 6 comes to lie between the notch surface and the pivot lever 7 when the latter occupies the rest position.

16 designates the control cams connected to, or formed by, the pivot lever 7, which permit the blocking elements 10 and 11 to be moved conjointly out of the gaps of the notches 6 of the ratchet wheels 5.

A guide member 17 for the tensioning line 4 connected to the drive element 3 is arranged at an interval from the drive element 3 of the tensioning device. The guide member 17, like the drive element 3, is retained in the side walls 1 and 2 of the tensioning device. The latter is provided with bifurcate prolongations 18 and 19 for this purpose. The guide member 17 preferably consists of a sleeve mounted rotatably on a bolt 20.

The guide member is positioned so that the forces introduced into the tensioning device through the tensioning line 4 and the further tensioning line 21 connected to the tensioning device act along a line 22 which is oriented substantially parallel to a support surface 23 by which the tensioning device can abut a load when it is used to lash the load down. As FIGS. 3 and 4 clearly show, the length of the line 22 is a function of the construction of the second tensioning.

I claim:

1. A tensioning device for tensioning lines, particularly chains or belts, having a rotatable drive element serving to wind up the tensioning line, at least one ratchet wheel connected integrally in rotation to the latter and exhibiting directionally oriented notches, and a pivot lever serving to introduce the rotary movement into the drive element, on which a drive pawl cooperating with the ratchet wheel is mounted slidably counter to the action of a spring and which is provided with at least one control cam to transfer a blocking mechanism associated with the ratchet wheel into an inoperative position, whilst the notches of the ratchet wheel are shaped so that they are retained firmly by the detent pawl during movement of the pivot lever in one direction, whereas during the movement of the pivot lever in the opposite direction they are entrained by the latter via the drive pawl, wherein the notches (6) of the ratchet wheel (5) are shaped so that the notch back (15) of the respective notch (6) in engagement with the detent mechanism (10, 11) in the blocked position of the ratchet wheel (5) is remote from the free end of the pivot lever (7), said blocking mechanism (10, 11) having a plurality of blocking elements (10, 11) which can be brough individually into engagement with the notches (6) of the ratchet wheel (5), said blocking elements (10, 11) being formed by sliders movable in reciprocation counter to the action of springs (12, 13).

2. A tensioning device as claimed in claim 1, wherein a guide member (17) for the tensioning line (4) connectable to the drive element (3) is arranged at an interval from the drive element (3).

3. A tensioning device as claimed in claim 2, wherein the guide member (17) is rotatable.

4. A tensioning device as claimed in claim 2, wherein the guide member (17) is positioned to that the tensioning forces introduced into the tensioning device through the tensioning line (4) are directed substantially parallel to the support surface (23) of the tensioning device.

5. A tensioning device as claimed in claim 1, which exhibits side walls (1, 2) for the rotatable mounting of the drive element (3), which form bifurcate prolongations (18, 19) to house a guide member (17) for the tensioning line (4).

6. A tensioning device as claimed in claim 5 wherein the guide member (17) is rotatable.

7. A tensioning device for tensioning lines, particularly chains or belts, having a roatable drive element serving to wind up the tensioning line, at least one ratchet wheel connected integrally in rotation to the latter and exhibiting directionally oriented notches, and a pivot lever serving to introduce the rotary movement into the drive element, on which a drive pawl cooperating with the rathcet wheel is mounted slidably counter to the action of a spring and which is provided with at least one control cam to transfer a blocking mechanism associated with the ratchet wheel into an inoperative position, whilst the notches of the ratchet wheel are shaped so that they are retained firmly by the detent pawl during movement of the pivot lever in one direction, whereas during movement of the pivot lever in the opposite direction they are entrained by the latter via the drive pawl, wherein the notches (6) of the ratchet wheel (5) are shaped so that the notch back (15) of the respective notch (6) in engagement with the detent mechanism (10,11) in the blocked position of the ratchet wheel (5) is remote from the free end of the pivot lever (7), said blocking mechanism (10, 11) having a plurality of blocking elements (10, 11) which can be brough individually into engagement with the notches (6) of the ratchet wheel (5), said blocking elements (10, 11) being movable conjointly out of the gaps of the notches (6) of the ratchet wheel (5) by control cams (16) arranged on the pivot lever (7), said blocking elements (10, 11) being formed by sliders movable in reciprocation counter to the action of springs (12, 13).

* * * * *

UNITED STATES PATENT AND TRADEMARK OFFICE
CERTIFICATE OF CORRECTION

PATENT NO. : 4,584,742
DATED : April 29, 1986
INVENTOR(S) : Herrn H. Speich

It is certified that error appears in the above-identified patent and that said Letters Patent is hereby corrected as shown below:

Column 1, Line 30: delete "vehicle" and substitute --vehicles--.

Column 2, Line 14: delete "FIGS" and substitute --figures,--.

Delete, in its entirety, the sentence starting at Column 2, Line 61 and ending at Column 2, Line 63.

Column 3, Line 20: delete "brough" and substitute --brought--.

Column 4, Line 7: delete "roatable" and substitute --rotatable--.

Column 4, Line 13: delete "rathcet" and substitute --ratchet--.
Column 4, Line 29: delete "brough" and substitute --brought--.

Signed and Sealed this

Twenty-sixth Day of August 1986

[SEAL]

Attest:

DONALD J. QUIGG

Attesting Officer

Commissioner of Patents and Trademarks